(12) United States Patent
Steck et al.

(10) Patent No.: US 9,356,452 B2
(45) Date of Patent: *May 31, 2016

(54) METHOD FOR EQUALIZING DIFFERENT STATES OF CHARGE OF BATTERIES

(71) Applicants: Robert Bosch GmbH, Stuttgart (DE); Samsung SDI Co., Ltd., Yongin-si, Gyeonggi-do (KR)

(72) Inventors: Armin Steck, Kusterdingen (DE); Christian Korn, Stuttgart (DE); Marianne Heizmann, Markgroeningen (DE); Andreas Gleiter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

This patent is subject to a terminal disclaimer.

(21) Appl. No.: 14/218,655

(22) Filed: Mar. 18, 2014

(65) Prior Publication Data

US 2014/0285151 A1 Sep. 25, 2014

(30) Foreign Application Priority Data

Mar. 20, 2013 (DE) .......................... 10 2013 204 888

(51) Int. Cl.
*H02J 7/00* (2006.01)
(52) U.S. Cl.
CPC .................................... *H02J 7/0016* (2013.01)
(58) Field of Classification Search
CPC ...................................................... H02J 7/0014
USPC ................. 320/107–108, 118–121, 127–130, 320/133–137

See application file for complete search history.

(56) References Cited

U.S. PATENT DOCUMENTS

| 2009/0085520 | A1  | 4/2009  | Murao |            |
|--------------|-----|---------|-------|------------|
| 2012/0161709 | A1* | 6/2012  | Fujii | H02J 7/0016 320/118 |
| 2014/0292259 | A1* | 10/2014 | Kim   | H02J 7/00 320/107 |

FOREIGN PATENT DOCUMENTS

| DE | 10 2006 022 394 A1 | 11/2007 |
| DE | 10 2010 002 326 A1 | 8/2011  |
| DE | 10 2012 000 653 A1 | 11/2012 |
| JP | 2002-8732 A        | 1/2002  |
| JP | 2009-178040 A      | 8/2009  |

* cited by examiner

*Primary Examiner* — Paul Dinh
(74) *Attorney, Agent, or Firm* — Maginot, Moore & Beck LLP

(57) ABSTRACT

A method for reducing a total charge loss of battery cells by equalizing states of charge includes making an initial check as to whether a temperature of at least one balancing unit lies below a preselectable temperature limit. Thereupon a check takes place as to whether a charging process of the battery cells has completed and the state of charge of the battery cells is >90%. A determination then follows as to whether a maximum state of charge difference between battery cells lies above an adjustable limit (DELTA_SoC).

10 Claims, 1 Drawing Sheet

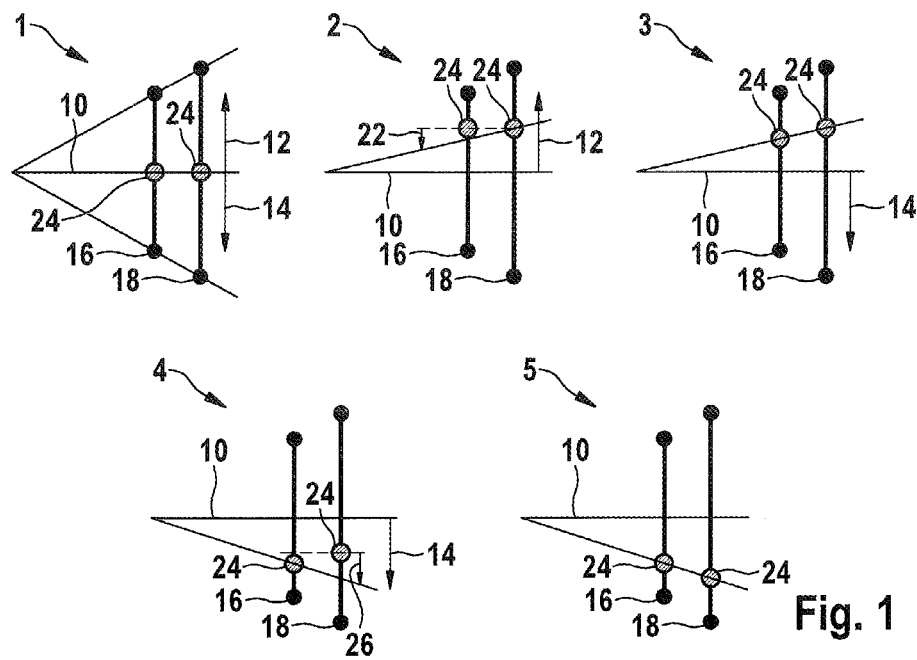
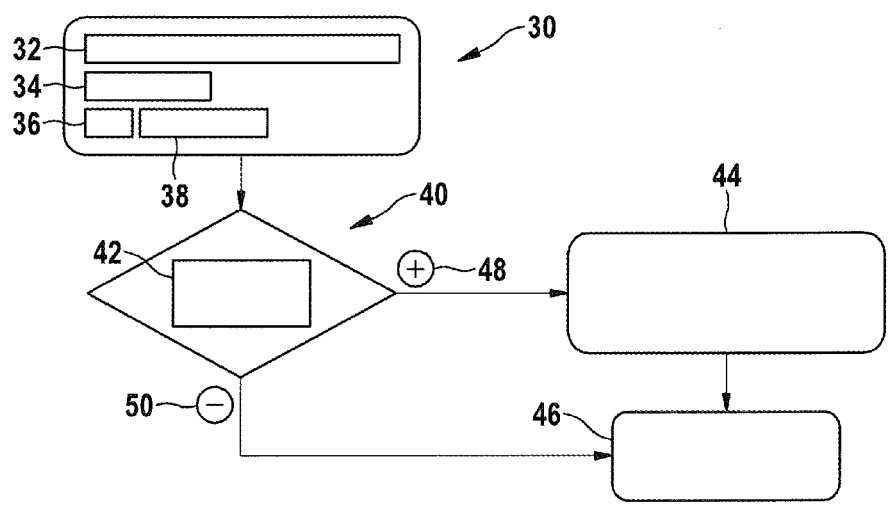
Fig. 1
Fig. 2

METHOD FOR EQUALIZING DIFFERENT STATES OF CHARGE OF BATTERIES

This application claims priority under 35 U.S.C. §119 to patent application no. DE 10 2013 204 888.2, filed on Mar. 20, 2013 in Germany, the disclosure of which is incorporated herein by reference in its entirety.

BACKGROUND

In hybrid vehicles and electric vehicles, lithium-ion technology battery packs are used, consisting of a large number of electrochemical battery cells connected in series. Such battery packs, which can comprise a plurality of battery modules, are monitored by means of a battery management system. On the one hand the battery management system monitors the battery pack, which can comprise a plurality of battery modules, and on the other hand guarantees a very long lifetime of the battery modules of the battery pack.

In order to ensure a long lifetime of individual battery modules of a battery pack, the states of charge (State of Charge—SoC) of individual battery cells should be matched to each other despite different self-discharges. This occurs by suitable cell symmetrizing, which is generally carried out resistively, i.e. using at least one resistance, which is also referred to as "cell balancing". For this purpose, at least one resistance and one switch element are associated with each battery cell in order to be able to specifically discharge individual battery cells by means of said at least one resistance, which is also referred to as a balancing resistance.

Besides different self-discharging rates of the individual battery cells, the capacitances of the battery cells also deviate from each other as a result of production scatter. Said effect is negligibly small at the start of the lifetime, but can increase over the lifetime of the battery cells through differences in the cell ageing and can cause differences in capacitance between the battery cells of up to several per cent to occur.

It is known to use a battery management system for monitoring the states of charge of a battery. It should guarantee, besides safety monitoring, a very long lifetime of the battery and ensure that the states of charge of the individual battery cells are matched to each other. This occurs by suitable cell symmetrization, the so-called "cell balancing". The cell symmetrization or balancing of the states of charge is generally carried out resistively. For this purpose, a resistance and a switch element are associated with each cell in order to be able to specifically discharge individual battery cells. A device for charge equalization of an energy source with a plurality of cells is known from DE 10 2006 022 394 A1, in which the cells are connected to a discharge unit for charge equalization, which at least partially discharges the battery cells. According to the prior art, however, it is also possible to perform the cell balancing capacitively—i.e. with switched capacitors—or inductively—by means of switched inductance. In these two cases energy can be exchanged between the cells with limited efficiency, whereas with resistive cell balancing the energy can only be converted into heat and is thus lost.

It is known that the maximum allowed charging power decreases with increasing state of charge, whereas the maximum allowed discharging power increases. For these reasons it would be desirable according to the prior art to operate a battery pack for hybrid vehicles or for electric vehicles at a state of charge of 50%. In general in practice, however, an operating window is used, for example between 40% and 60% state of charge. For "plug-in hybrids" the operating window is correspondingly greater, for example 10% to 90% state of charge.

An established balancing strategy seeks to achieve a constantly equal state of charge (SoC) of all battery cells. In order to achieve this, all battery cells are generally symmetrized to identical open circuit voltages. Said strategy is justified for new condition battery cells with almost identical capacitance. For battery cells of different capacitance, however, such as occurs through production scatter and ageing, said balancing strategy leads to unnecessary energy losses through the balancing.

In battery systems in which the capacitance of the individual battery cells is not known and resistive cell balancing is carried out until a common state of charge (SoC) is reached, the total charge to be equalized is very high because charge is unnecessarily discharged via the balancing resistances, which is far greater than the pure equalizing of the different self-discharges of the individual battery cells.

According to the illustration in FIG. 1, two different battery cells 16, 18 of a battery module not shown in detail initially have a state of charge 10 (SoC) of 50%, wherein the capacitance of the first battery cell 16 is less than that of the second battery cell 18. Starting from said state considered in the first step, a charging process 12 of the two battery cells 16 and 18 takes place in the second step, during which the present state of charge (SoC) of the two battery cells 16, 18 rises, as indicated in step 2. During the charging process the current state of charge 24 of the first battery cell 16 rises above the current state of charge 24 of the second battery cell 18. Therefore in step 2 according to the illustration in FIG. 1, discharging 22 of the first battery cell 16 takes place, so that the two states of charge 24 of battery cells that are to be equalized with each other in step 3 are again identical.

Step 4 shows that starting from the state of charge 10 of the two battery cells 14, 16, which corresponds to 50%, a discharging process 14 takes place while the current state of charge 24 of the first battery cell 16 exceeds the current state of charge 24 of the second battery cell 18 by an excess charge, so that as shown in step 4 of the illustration according to FIG. 1, discharging 26 of the second battery cell 18 takes place, so that the two states of charge (SoCs) of the first battery cell 16 and of the second battery cell 18 again equalize with each other and in step 5 are again identical. It can thus be seen from the illustration according to FIG. 1 that for such a continuous charge equalization, i.e. the aim of the objective, that all battery cells 16, 18 have the same state of charge (SoC), not only is unnecessary charge discharged via the balancing resistances required for resistive balancing, but that at the same time an unnecessary number, i.e. an avoidable number, of switching processes of the balancing unit (BCU) occurs. This in turn leads to a significant reduction in the lifetime of the BCUs used for resistive balancing.

SUMMARY

The object of the present disclosure is to reduce the total to a more balanced charge while maintaining SoC-based cell balancing by specifying a fixed limited state of charge window (SoC window), within which cell balancing can take place.

According to the disclosure, a method is proposed, according to which cell balancing is only allowed within a certain, well-defined state of charge window (SoC window). Preferably, said SoC window can thus be specified such that only a fully charged battery cell, having a state of charge (SoC) >90%, may be used for symmetrization. Besides a BCU, which only enables resistive charge equalization and comprises a number of resistances that can be connected to a battery cell, the method proposed according to the disclosure for equalizing different states of charge of battery cells within a well-defined SoC window further requires switching logic for the BCU.

With the proposed method according to the disclosure boundary conditions are checked, for example as to whether the electric vehicle or hybrid vehicle is currently in the park mode or not. The vehicle may in no way be in the charging or discharging mode. Furthermore, for performing the proposed method according to the disclosure, a check is made by the battery management system as to whether the battery cell is fully charged, i.e. a charging process has finished and the state of charge of the battery cell is greater than 90%. Furthermore, a check is made as to whether the temperature of a balancing unit (BCU) is below an adjustable temperature limit, which can e.g. be given by a temperature such as 40° C. or 45° C., so that there is no overheating of the BCU when carrying out a cell balancing process.

Besides the checking of the above-mentioned three boundary conditions, following the proposed method according to the disclosure a check is made 42 as to whether there is actually a need for cell balancing. For this purpose it is necessary that a maximum state of charge difference (SoC difference) of all battery cells lies above an adjustable limit DELTA_SoC, which can be specified e.g. to be of the order of magnitude of 3%. Of course other spreads, i.e. differences of the state of charge, can also be specified in this connection. In order to determine this, the minimum state of charge of all battery cells, i.e. the value SoC_MIN, is determined. If it is true for at least one of the battery cells i that its individual state of charge SoC_i is greater than SoC_MIN by more than DELTA_SoC, then there is a need for a cell balancing process.

If the need exists as explained above, and said three boundary conditions are fulfilled, a balancing process occurs autonomously. This means that the BCU issues a request to the relevant balancing units to switch the balancing resistances R_bal required for resistive performance of the cell balancing step to the respective battery cells for a defined time. The BCUs may switch off in the event of heating above a defined temperature threshold, but the BCUs are excluded from automatically switching on again.

Finally, in a further operation the individual balancing need per battery cell is determined. The need for the charge of a battery cell i to be removed is given by Q_i=C_NOM*(SoC_i-SoC_MIN), where C_NOM is the nominal capacitance of the battery cells.

According to the voltage $U_{ocv}$ for the SoC of the battery cell and the resistance value of the balancing resistance R_bal, using Ohm's law the time period during which the cell balancing method is to be carried out can be determined according to the following relationship:

$$t_i = \frac{\frac{Q}{U_{ocv}}(SOC_i)}{R\_bal}$$

where
R_bal: is the balancing resistance,
$SoC_i$ is the state of charge of battery cell i,
$Q_i$ is the quantity of heat to be removed and
$U_{ocv}$: is the voltage of the battery cell.

Each balancing unit i is now switched for the time period $t_i$ determined above, but for no longer than an adjustable maximum time. The upper time limit is used to protect against overheating.

In a further implementation of the proposed method according to the disclosure, there is the possibility of adopting the proposed method according to the disclosure for a battery pack by adapting the above-mentioned parameters to battery systems or an operating strategy. The parameter DELTA_SoC defines the allowed state of charge variance below which the performance of a balancing step is not allowed. This in turn means that when at said limit, i.e. SoC_MIN is balanced, the difference between the maximum and minimum state of charge (SoC) of the battery cells just amounts to DELTA_SoC. The value should be selected in any case to be large compared to the uncertainty interval within which the state of charge SoC of the battery cells can be determined.

The maximum temperature of the balancing unit prior to switching on the balancing process should be selected such that the maximum operating temperature of the balancing unit is not exceeded as a result of the additional anticipated temperature development during performance of the cell balancing.

It has been mentioned above that according to the proposed method according to the disclosure the cell balancing can only be carried out from an individual state of charge of one of the battery cells of >90%. Instead of said SoC window between 90% and 100% state of charge, any other SoC window can also be used. It is important during selection of the window within which cell balancing takes place, that it is not too large on the one hand, otherwise crucial advantages are lost, but on the other hand it is to be selected to be large enough such that the vehicle can be parked within said SoC window with sufficiently high probability.

In order to avoid excessive divergence of individual states of charge $SoC_i$ for the case in which the vehicle is parked for a very long time outside the selected SoC window, the proposed method according to the disclosure can be further extended by "emergency cell balancing". According to said extension, for example the cell balancing can be additionally carried out from a SoC variance DELTA2_SoC>>DELTA_SoC, wherein the three boundary conditions, which were checked in the first step of the method, can either be extended by a larger SoC window with regard to a larger state of charge and/or the restriction with regard to the park mode of the electric vehicle or hybrid vehicle can be relaxed.

The proposed method according to the disclosure enables carrying out a balancing of charge differences, i.e. cell balancing between battery cells of a battery module of a battery pack for a hybrid vehicle or for an electric vehicle, wherein said charge equalization is possible without explicit knowledge of the exact individual battery cell capacitances in the event of differences in capacitance of the individual battery cells with respect to each other in the region of at least 20%. How much difference in capacitance can ultimately be coped with without knowledge of the actual capacitance of the system depends to a not inconsiderable extent on the driver's driving profile.

Furthermore, the charge loss that occurs during cell balancing can be considerably reduced by means of the proposed method according to the disclosure. The proposed method according to the disclosure enables, in an advantageous manner, the cell balancing to be individually adapted to the self-discharge characteristic of uniquely different individual battery cells by selecting a suitable minimum time interval, and hence different ageing cycles of individual battery cells to be taken into account.

Another advantage connected with the proposed solution according to the disclosure is to be seen in that the lifetime of the balancing resistances R_bal used for cell balancing can be extended. An extension of the lifetime can especially be achieved by the limitation of the number of switching cycles that can be achieved with the proposed method according to the disclosure. As many switching cycles as necessary for the cell balancing are allowed by the BCU, and on the other hand as are allowed by the discharging means.

BRIEF DESCRIPTION OF THE DRAWINGS

In the figures:

FIG. 1 shows in a schematic representation continuous cell balancing of two battery cells, in order to achieve or to maintain an identical state of charge (SoC); and FIG. 2 shows a block diagram for cell balancing in the allowed, i.e. permitted SoC window between 90% and 100%.

DETAILED DESCRIPTION

The illustration according to FIG. 1 shows in schematic form the continuous equalizing of charge differences of battery cells, wherein according to the illustration in FIG. 1 continuous cell balancing is carried out on two adjacent battery cells.

FIG. 1 shows the continuous performance of equalizing steps (cell balancing steps for maintaining an identical state of charge SoC) between two battery cells 16 and 18. Starting from a state of charge 10, corresponding to a state of charge (SoC level) of 50%, it is shown in FIG. 1 at step 1 that a charging process 12 is running vertically upwards in relation to the state of charge 10, whereas a discharging process, compare reference character 14, runs in the opposite direction in relation to the state of charge 10.

The first battery cell is designated with reference character 16, the other, second battery cell with reference character 18. In the first step according to the illustration in FIG. 1, both battery cells 16, 18 have an identical state of charge 10 of approx. 50%. In the second step it can be seen that charging of both battery cells 16, 18 is taking place above the state of charge 10 of 50% according to a charging process 12. In relation to the gradient, during the transition from the second step to the third step the first battery cell 16 is to be slightly discharged until, compare in the third step, the two current states of charge 24 of the first battery cell 16 and the second battery cell 18 correspond to each other again. In the fourth step according to the illustration in FIG. 1 a discharging process 14 of the two battery cells 16, 18 is taking place such that the current state of charge 24 falls below the state of charge of 50%. In order to bring both battery cells 16 and 18 back to an identical state of charge, as indicated in step 4 a resistive partial discharging of the second battery cell 18, indicated by reference character 26 in step 4 according to FIG. 1, is necessary. In step 5 the two battery cells 16, 18 are again balanced, i.e. have a mutually corresponding current state of charge 24, which lies below the state of charge 10 of 50%.

The balancing of battery cells sketched using FIG. 1, i.e. the equalizing of different states of charge between at least two battery cells 16, 18, can be described on the one hand such that there are relatively many switching processes of balancing units (BCU), which results in a considerable reduction in the lifetime of said balancing units, likewise for the balancing resistances necessary for resistive balancing. If the battery, as indicated in FIG. 1, is continously balanced such that all battery cells have the same state of charge, in addition the unnecessary charge is discharged by means of the balancing resistances used for the resistive cell balancing.

FIG. 2 shows the proposed procedure according to the disclosure for carrying out cell balancing of battery cells, i.e. equalizing different states of charge between the cells while minimizing the charge loss and while minimizing the switching cycles by the BCU necessary for carrying out the cell balancing.

The proposed method according to the disclosure includes the following components with regard to a provided battery management system. A Battery Control Unit (BCU) is provided that can determine the current state of charge (SoC) of all battery cells 16, 18 connected in series. A balancing unit i is provided for one each of the battery cells i or 16, 18, which comprises a number of resistances R_bal and comprises switching logic, wherein the individual balancing resistances R_bal can be connected to a battery cell i.

In accordance with the proposed method according to the disclosure, as illustrated in FIG. 2 according to a block diagram 30, a check initially takes place as to whether certain boundary conditions are fulfilled. It is initially clarified within a query 32 as to whether the electric vehicle or hybrid vehicle is in the park mode or not. Then a query 34 takes place as to whether the battery cells i are fully charged, i.e. a potentially previously occurring charging process has finished and said query is combined in an AND combination 36 with whether the respective state of charge of the battery cells i is greater than 90%. Furthermore, a query 38 takes place as to whether the temperature of a Battery Control Unit, which comprises a balancing unit i, is safely below an adjustable temperature limit, e.g. 40° C. or 45° C.

Then determination 40 of state of charge differences between individual battery cells i takes place. A check is made as to whether a maximum state of charge difference of all battery cells i is above an adjustable limit DELTA_SoC. Said maximum adjustable limit DELTA_SoC can for example be of the order of magnitude of approximately 3%. During determination of whether there is a need for balancing, a value SoC_MIN is determined for the minimum state of charge of all cells. If the need for balancing is rejected, then the rejection 50 leads to an inactive end state 46 of the method.

If it is true for at least one battery cell i that its individual state of charge SoC_i lies above SoC_MIN by more than DELTA_SoC, there is a need for balancing. If the need for cell balancing is seen to exist according to the above check, which is identified in the block diagram with the reference character 48, and if the boundary conditions discussed further above are fulfilled, the performance of a cell balancing step 44 takes place, wherein the following boundary conditions are to be noted:

The cell balancing occurs automatically, i.e. the Battery Control Unit (BCU) outputs the request to the relevant balancing units i to switch the balancing resistances R_bal to the respective battery cells 16, 18 or i for a defined time. Resistive cell balancing thereby takes place for a predetermined time $t_i$. The balancing units i used may switch off in the event of heating above a certain temperature threshold, but it is not permitted for the corresponding balancing units i to automatically switch on again.

Determining an individual need for balancing takes place. This takes place by determining the need for a charge to be removed per battery cell i, i.e. the quantity of charge Q_i to be removed. The determination of the quantity of charge Q_i to be removed takes place according to the following relationship:

$$Q\_i \triangleq C\_NOM \cdot (SoC\_i - SoC\_MIN) \text{ where}$$

C_NOM $\triangleq$ nominal capacitance of the battery cell i.

The time $t_i$ during which a balancing step is to be carried out is determined depending on the voltage U_OCV for the individual state of charge SoC_i of the battery cell i and on the value of the balancing resistance R_bal according to the following relationship:

$$t_i = \frac{Q\_i \cdot R\_bal}{U\_OCV \cdot (SoC\_i)}$$

where
Q_i $\triangleq$ charge of the battery cell i to be removed,
U_OCV $\triangleq$ open circuit battery cell voltage,
SoC_i $\triangleq$ state of charge of the battery cell i, and
R_bal $\triangleq$ resistance value of the balancing resistance.

Each of said balancing units i is switched for the time $t_i$ determined according to the above, but only for an adjustable maximum time. The adjustable maximum time is used to protect the individual balancing units i against overheating. The relevant parameters for carrying out the proposed method according to the disclosure can be adapted according to the respective battery system or the operating strategy of the battery module or of the battery pack. The value DELTA_SoC defines the allowed state of charge variance, below which balancing may not take place. If, however, balancing is carried out towards said limit value, then the difference between the maximum and minimum state of charge of the battery cell i is just DELTA_SoC. Said value should be selected in any case such that it is large compared to the uncertainty interval in which the battery cells' SoC_i is determined.

The maximum temperature of the balancing unit i prior to switching on cell balancing is to be selected such that the temperature of the respective balancing unit_i does not fall below the maximum operating temperature of the respective balancing unit_i as a result of the additional expected temperature increase occurring during the cell balancing process. After completion of the cell balancing step 44 an inactive end state 46 is reached to terminate the process.

In embodiments of the proposed method according to the disclosure, instead of the SoC state of charge window between 90% SoC and 100% SoC described above in the context of boundary condition checking, any other state of charge window can be used. During the selection of said window it is important on the one hand not to select it to be too large. On the other hand it must be selected to be large enough such that the vehicle is parked with sufficiently high probability within said state of charge window.

In order to avoid scattering of individual states of charge SoC_i of the battery cells for the case in which the vehicle is parked for a very long time outside the selected SoC window, the method can be extended with emergency balancing: the cell balancing can then additionally be carried out for individual battery cells i from a state of charge variance of DELTA2_SoC>>DELTA_SoC. The boundary conditions in the emergency case balancing can either be relaxed with a larger allowed state of charge window, or a restriction according to which the vehicle must be in the park mode and thus not in the charging mode or the discharging mode can be relaxed.

What is claimed is:

1. A method for reducing a total charge loss of battery cells by equalizing states of charge comprising:

a) checking boundary conditions as to whether (i) a temperature of at least one balancing unit is below a preselectable temperature limit, and (ii) a charging process of the battery cells has completed and the state of charge (SoC) of the battery cells is greater than 90%,
   b) determining whether a maximum SoC difference of the battery cells lies above an adjustable limit (DELTA_SoC),
   c) if steps a) and b) of the method are affirmative, autonomously cell balancing the battery cells by connecting the battery cells to balancing resistances ($R_{13}$ bal) for a time period ($t_i$) with $$t_i = \frac{Q\_i \cdot R\_bal}{U\_OCV \cdot (SoC\_i)},$$

wherein
   Q_i $\triangleq$ charge of a battery cell i of the battery cells to be removed,
   $U_{13}$ OCV $\triangleq$ open circuit battery cell voltage,
   SoC_i $\triangleq$ state of charge of the battery cell i, and
   R_bal $\triangleq$ resistance value of the balancing resistance; and
   d) switching off the at least one balancing unit after expiry of the time period ($t_i$).

2. The method according to claim 1, wherein the charge Q_i of the battery cell i to be removed according to step c) is determined according to the following relationship:

$$Q\_i \triangleq C\_NOM \cdot (SoC_{13} i - SoC\_MIN) \text{ with}$$

$C_{13}$ NOM $\triangleq$ nominal capacitance of the battery cell i.

3. The method according to claim 1, wherein according to step b) a need for balancing is affirmed if for at least one battery cell of the battery cells the individual state of charge SoC_i of the at least one battery cell is fulfilled by more than the DELTA_SoC being greater than a parameter SoC_MIN.

4. The method according to claim 1, wherein the at least one balancing unit automatically switches off in the event of heating above a temperature threshold and remains switched off.

5. The method according to claim 1, wherein the at least one balancing unit remains connected for the time period ($t_i$), but for no longer than an adjustable maximum time.

6. The method according to claim 3, wherein:
   the parameter SoC_MIN is a minimum SoC of an individual battery cell of the battery cells, and
   the parameter SoC_MIN lies above a desired reserve charge.

7. The method according to claim 1, wherein the DELTA_SoC defines a permissible SoC variance, below which no balancing steps are carried out.

8. The method according to claim 1, wherein during the balancing, balancing is performed to the DELTA_SoC and a difference between a maximum state of charge and a minimum state of charge of the battery cells corresponds to the DELTA_SoC.

9. The method according to claim 1, wherein a maximum number of cycles of the at least one balancing unit and coverage of a possible need for symmetrizing by the time period ($t_i$) of a balancing step are adapted to each other.

10. The method according to claim 1, wherein specific battery cells or subsets of the battery cells are balanced individually.

* * * * *